United States Patent [19]
Huff et al.

[11] Patent Number: 5,145,194
[45] Date of Patent: Sep. 8, 1992

[54] IMPACT TOOL CHUCK

[75] Inventors: Robert O. Huff, Piedmont; Paul T. Jordan, Seneca; Valerie Owens, Townville, all of S.C.

[73] Assignee: Jacobs Chuck Technology Corporation, Wilmington, Del.

[21] Appl. No.: 719,177

[22] Filed: Jun. 21, 1991

[51] Int. Cl.⁵ .................................................. B23B 31/12
[52] U.S. Cl. ........................................ 279/62; 279/140; 279/902
[58] Field of Search ............... 279/1 K, 1 ME, 60–65, 279/140, 902

[56] References Cited

U.S. PATENT DOCUMENTS

| | | |
|---|---|---|
| 573,189 | 12/1896 | Vogel . |
| 962,746 | 6/1910 | Cogswell ........................ 279/64 |
| 1,473,488 | 11/1923 | McConnell . |
| 1,476,903 | 12/1923 | McConnell . |
| 1,495,233 | 5/1924 | McConnell . |
| 1,532,329 | 4/1925 | McConnell . |
| 1,705,275 | 3/1929 | Von Neudeck ................ 279/64 |
| 1,776,675 | 9/1930 | Bascom ........................ 279/60 |
| 3,702,705 | 11/1972 | Schadlich ..................... 279/62 |
| 3,807,745 | 4/1974 | Bent ............................. 279/60 |
| 3,948,534 | 4/1976 | Schnizler, Jr. et al. ........ 279/62 |
| 4,305,597 | 12/1981 | McCarty ...................... 279/22 |
| 4,695,065 | 9/1987 | Komatsu et al. ............. 279/60 |
| 4,842,288 | 6/1989 | Ando ............................ 279/62 |
| 4,930,793 | 6/1990 | Ando ......................... 279/1 K X |
| 5,009,439 | 4/1991 | Sakamaki .................... 279/62 |
| 5,044,643 | 9/1991 | Nakamura .................. 279/1 K X |

FOREIGN PATENT DOCUMENTS 0216603 9/1988 Japan ............................ 279/61

*Primary Examiner*—Steven C. Bishop
*Attorney, Agent, or Firm*—Nicola A. Pisano; Robert R. Jackson

[57] ABSTRACT

A tool chuck suitable for use with manual or powered impact drivers is described. The chuck comprises a body which carries a rotatable nut and a plurality of slidable jaws, driven by the rotatable nut. An anti-friction bearing is disposed between the rotatable nut and a bearing thrust ring mounted on the body. The bearing thrust ring has a plurality of detents and may cooperate with a compression spring to prevent the chuck from loosening during operation.

36 Claims, 5 Drawing Sheets

IMPACT TOOL CHUCK

BACKGROUND OF THE INVENTION

1. Field Of The Invention

This invention relates to drill chucks for use with manual or power impact or hammer drivers. Such tools are capable of reciprocatory or percussion action as well as rotary motion. More particularly, the present invention relates to a chuck which will maintain a secure grip on a tool without the need to frequently retighten the chuck.

2. Prior Art

Both hand and power tool impact drivers are well known. Although masonry twist drills are the most common tools used with such drivers, the drivers may also be used for cutting or abrading operations. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks has been developed by the art. In the simplest form of chuck, three jaws spaced circumferentially 120° apart from each other are constrained by a conical body threaded onto the drive shaft so that rotation of the body in one direction relative to the drive shaft forces the jaws into gripping relationship with respect to the cylindrical shank of a tool, while rotation in the opposite direction releases the gripping relationship. Such a chuck may be keyless if the body is rotated by hand, or may require a key to develop sufficient torque to tighten or loosen the jaws.

A perceived disadvantage of presently known keyed and keyless chucks is the tendency of the chuck jaws to lose their grip on the tool shank due to longitudinal vibrations transmitted through the chuck and tool during operation of the tool. It is therefore an object of the present invention to provide a tool chuck for use in impact tools which is less susceptible to loosening than presently known devices.

Other known chucks (such as the "jaw pusher" or "Albrecht" type designs) tend to become tighter with use, which can make them difficult to open. It is therefore another object of this invention to provide an impact tool chuck which does not become unduly difficult to open as a result of use.

SUMMARY OF THE INVENTION

In accordance with the present invention, an impact tool chuck is provided having improved resistance to inadvertent loosening due to operation-induced vibration. The invention employs an antifriction bearing interposed between the nut and the body to decrease the friction losses in the mechanism so as to increase the effective tightening torque. A thrust ring, which serves as the rear bearing race surface, has a plurality of detents into which balls of the bearing are captured when the nut is tightened onto the body. Alternatively, or in addition, similar detents may be provided on the surface of the nut which serves as the other bearing race surface. A spring, preferably a belleville spring, may be interposed between the thrust ring and the nut to cooperate with the thrust ring to keep the nut tightened onto the body during operation of the tool, so that the chuck jaws maintain a high gripping force on the shank of a tool engaged in the chuck. In an alternate embodiment, in which the thrust ring has a built-in deflection or camber, the thrust ring acts both as a detented bearing race surface and as a belleville spring. In yet another embodiment, the thrust ring has no deflection or camber in the unloaded condition, i.e., when the jaws of the chuck are not tightened onto a tool shank, but is sufficiently flexible to elastically assume a compression-spring style deflection when the jaws of the chuck are loaded (i.e., tightened onto a tool shank).

BRIEF DESCRIPTION OF THE DRAWINGS

Further objects and advantages of the invention will become apparent from the following detailed description and the accompanying drawings in which:

FIG. 2A is taken along line 2A—2A of FIG. 1B, and FIG. 2B is taken along the line 2B—2B of FIG. 2A.

FIG. 3B is taken along the line 3B—3B in FIG. 3A.

FIG. 4B is taken along the line 4B—4B in FIG. 4A.

DETAILED DESCRIPTION OF THE PREFERRED EMBODIMENTS

The present invention may be practiced advantageously on either keyless chucks or chucks employing a conventional geared key. For illustration purposes, application of the inventive principle is described herein with reference to a keyless chuck design. It is to be understood, of course, that the invention could be equally applied to keyed tool chucks.

Figure 1A:
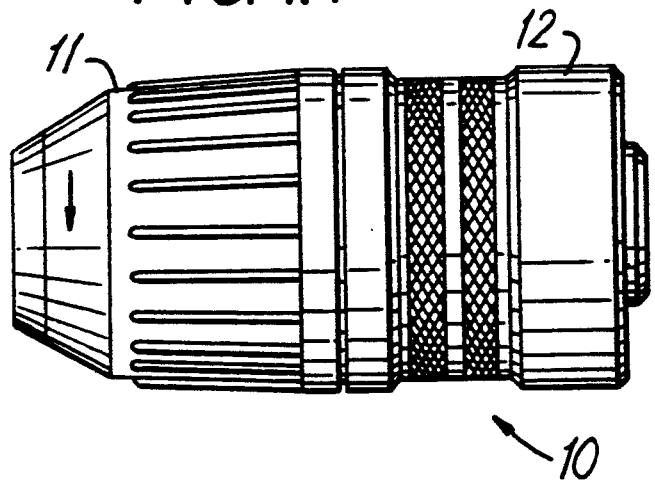
FIG. 1A is an elevational view of an illustrative keyless chuck constructed in accordance with the present invention.
Figure 1B:
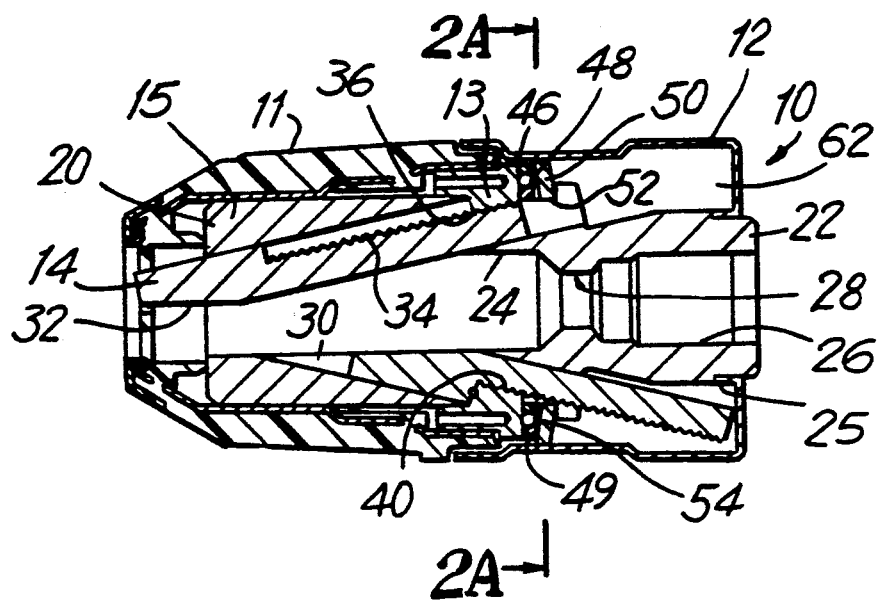
FIG. 1B is a longitudinal sectional view of the keyless chuck shown in FIG. 1A. The upper and lower portions of FIG. 1B show the chuck in different conditions.

Referring now to FIGS. 1A and 1B, there is illustrated a keyless chuck 10 constructed in accordance with the present invention. The following description of the chuck provides the context in which the present invention may be practiced, although the invention may be practiced with other chuck structures having only some of the elements illustrated. Chuck 10 includes front sleeve member 11, optional rear sleeve member 12, body member 15 and jaws 14. Body member 15 is generally cylindrical in shape and comprises nose or forward section 20 and tail or rearward section 22. Axial bore 24 is formed in nose section 20 of body member 15. Axial bore 24 is somewhat larger than the largest tool shank which the chuck is designed to accommodate. A threaded bore 26 is formed in tail section 22 of body 15 and is of a standard size to mate with the threaded drive shaft of a powered or hand driver (not shown). Bores 24 and 26 may communicate at central region 28 of body member 15. If desired, threaded bore 26 may be replaced by a tapered, unthreaded bore of a standard size to mate with a tapered drive shaft.

Passageways 30 are formed in the body member 15 to accommodate each jaw 14. Preferably, three jaws 14 are employed and each jaw 14 is separated from the adjacent jaw by an arc of 120°. The axes of passageways 30 and jaws 14 are angled with respect to the chuck axis but intersect the chuck axis at a common point ahead of chuck body 15. Each jaw 14 has a tool engaging face 32 which is generally parallel to the axis of chuck body 15 and threads 34 on its opposite or outer surface.

Circumferential groove 36 is formed in the body member 15 and extends into passageways 30. Split nut 13 having female threads 40 is located in circumferential groove 36 and secured therein by front sleeve member 11. Split nut 13 is press fit into the bore of front sleeve 11. Preferably, front sleeve 11 is formed from a structural plastic such as a polycarbonate, a filled polypropylene, e.g., glass-filled polypropylene, a blend of structural plastic materials, or a plastic and metal composite structure.

A circumferential race 46 is formed on the rear face of split nut 13 to accommodate an antifriction bearing, for example, ball bearing assembly 48. Bearing assembly 48 includes bearing retainer 49 which locates the plurality of balls while permitting them to roll. Bearing thrust ring 50 is provided with central hole 52 sized to accommodate body member 15. One face of bearing thrust ring 50 has formed thereon bearing race 54, against which bearing assembly 48 rides. Central hole 52 of ring 50 is sufficiently large to permit the retraction of jaws 14 therethrough. Rear sleeve member 12 has bore 62 and flange 25 with which rear sleeve member 12 is press-fit onto tail section 22 of body member 15. If desired, rear sleeve member 12 may be omitted and front sleeve member 11 extended to the tail end of body 15. This alternative is feasible when a spindle lock is provided on the driver or when the driver is used to tighten or loosen the jaws.

The circumferential surface of front sleeve member 11 may be provided with longitudinal ribs or other protrusions to enable the operator to grip it securely as shown in FIG. 1A. In like manner, the circumferential surface of rear sleeve member 12, if employed, may be knurled or ribbed, if desired.

It will be appreciated that rear sleeve member 12 is fixed to body member 15 via flange 25 while front sleeve member 11 is fixed to split nut 13. Thus, relative rotational movement of front and rear sleeve members 11, 12 will cause jaws 14 to be advanced or retracted, depending upon the direction of the relative motion. As bearing assembly 48 is interposed between the relatively rotating parts, the frictional losses are minimized and a maximum portion of the applied tightening torque is converted to a tightening force on the tool shank. While chuck 10 of FIGS. 1A and 1B may be operated manually, it may also be operated by the power driver.

Figure 2A:
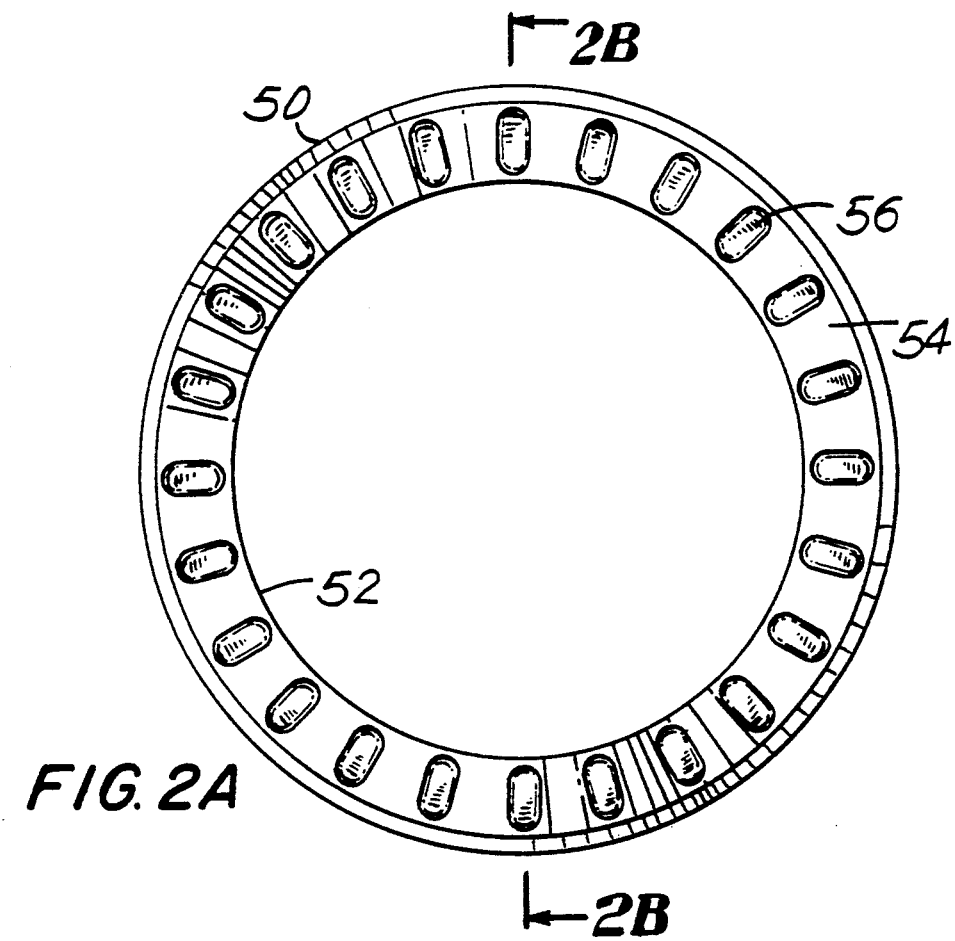
FIGS. 2A and 2B are, respectively, elevational front and cross sectional views of a thrust ring constructed in accordance with the present invention.
Figure 2B:
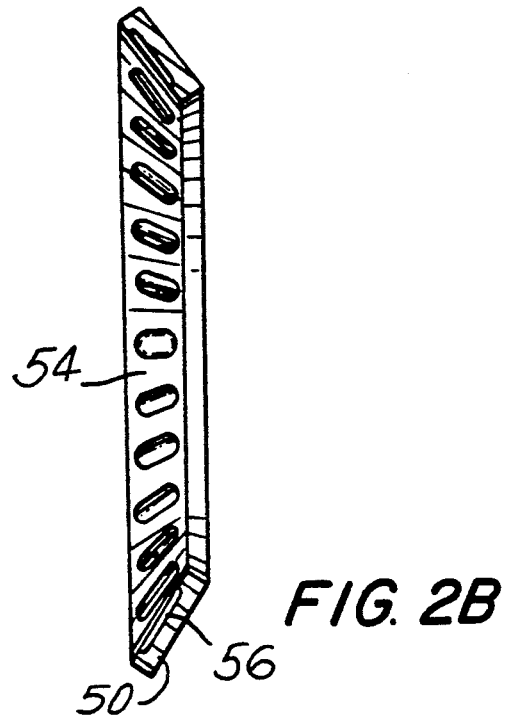
Figure 3A:
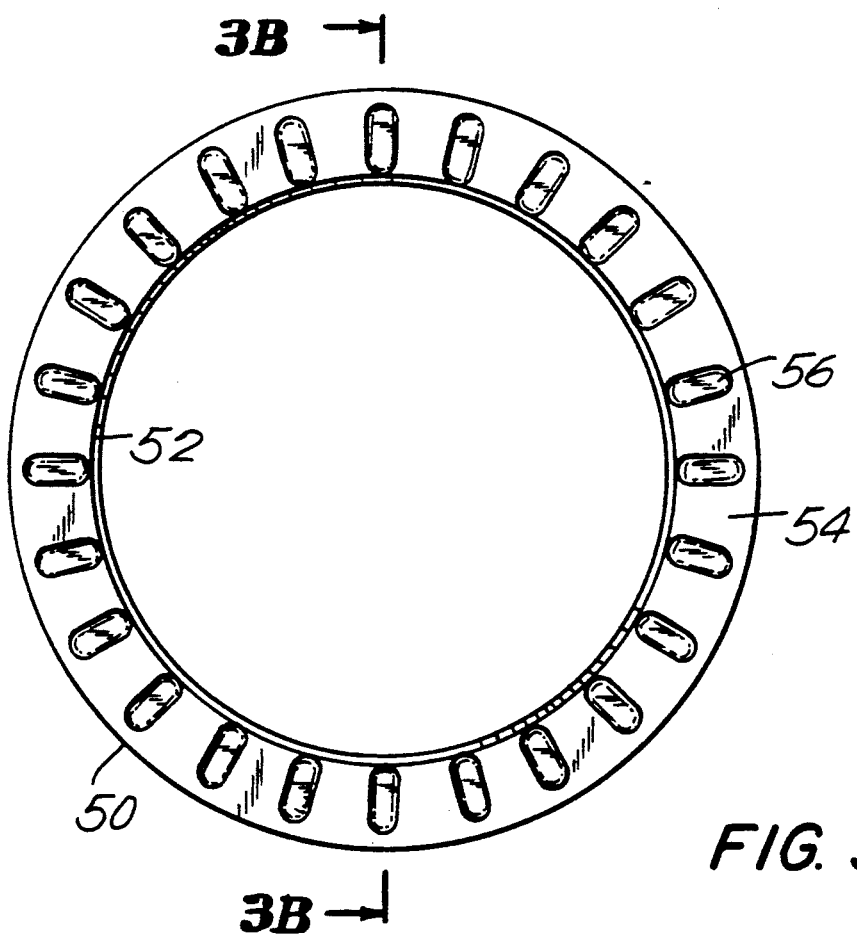
FIGS. 3A and 3B are, respectively, elevational front and cross sectional views of an alternate embodiment of a thrust washer constructed in accordance with the present invention.
Figure 3B:
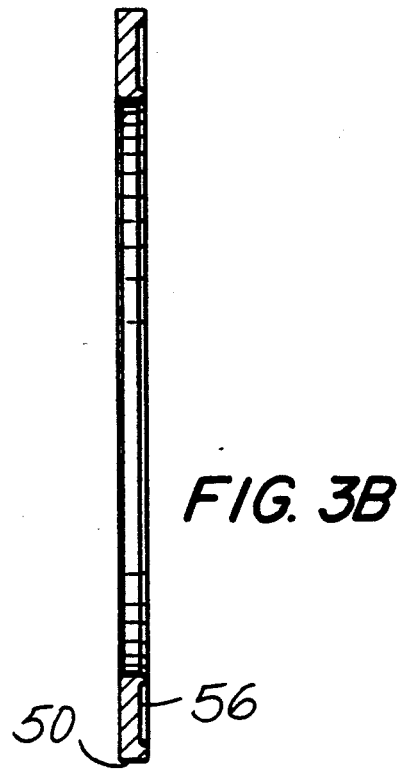
Figure 4A:
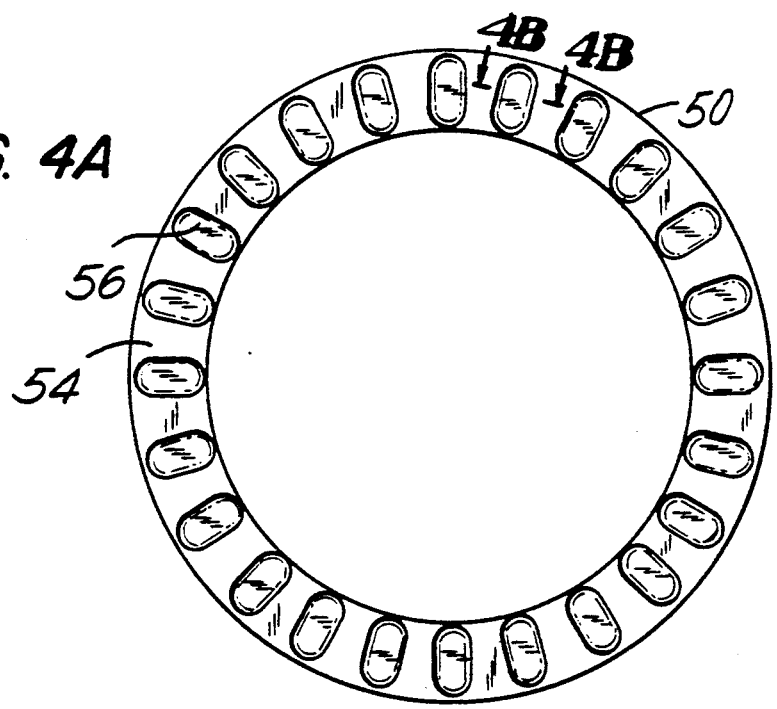
FIGS. 4A and 4B are, respectively, plan and cross-sectional views of possible embodiments of detents constructed in accordance with the present invention which may be incorporated in the thrust washers of FIGS. 2 and 3.

Referring now to FIGS. 2, 3 and 4, thrust ring 50, as it may be constructed for use as shown in chucks of the type illustrated in FIGS 1A and IB, will now be described. Bearing thrust ring 50 may have a plurality of detents or depressions 56 formed in bearing surface 54. If provided, detents 56 serve to capture the balls of bearing assembly 48 during tightening of nut 13 on body 15. In a preferred embodiment, detents 56 have an axis oriented substantially perpendicular to axial bore 24 (i.e., radially of the central longitudinal axis of the chuck). If desired, additional similar detents may be provided in the circumferential race 46 formed on the rear face of split nut 13. Alternatively, the detents in race 46 of split nut 13 may be employed in lieu of having such detents in bearing race 54 of thrust ring 50. The edge of the detents, which are aligned with radii extending from the axial bore of body member 15, may have symmetrically radiused corners.

Figure 4B:
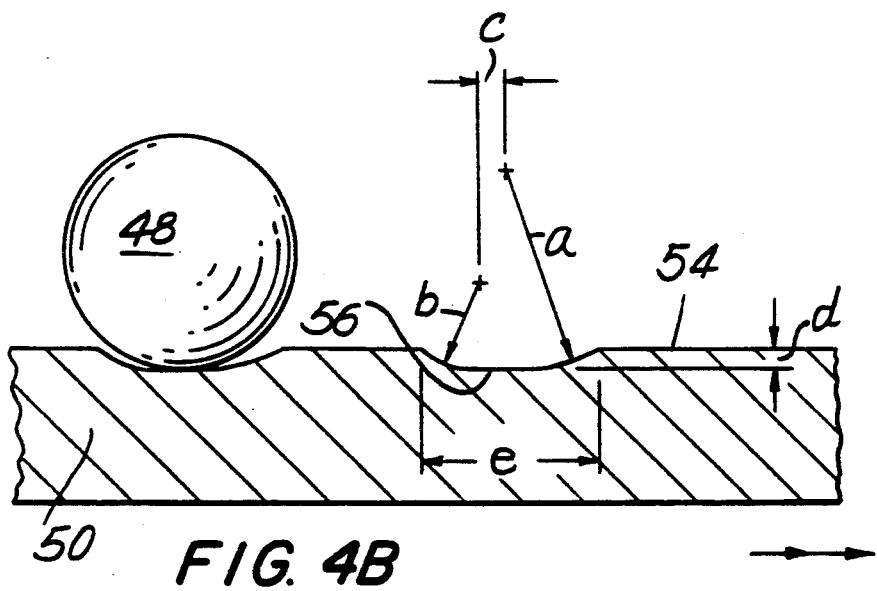

In a preferred embodiment, shown in FIG. 4B, the radially aligned opposing edges of a single detent may have nonsymmetrically radiused corners. Thus, for the detent shown in FIG. 4B a gradually radiused corner of radius "a" is used in the chuck closing direction (i.e., direction of relative rotation between nut 13 and body member 15 whereby jaws 14 are closed upon the tool shank, indicated by the double arrow) and a relatively more sharply radiused corner of radius "b" is used in the opening direction (i.e., the direction of relative rotation between nut 13 and body member 15 whereby jaws 14 are loosened from engagement with the tool shank), as shown in FIG. 4B. The use of nonsymmetrical opposing edges for each detent produces a bias between opening and closing torques required to obtain relative rotation between nut 13 and body member 15, thereby increasing the resistance of the chuck to opening during operation. For example, a detent used in the thrust ring for a 10 mm chuck may have the following dimensions (all in inches) indicated on FIG. 4B: $a=0.08$, $b=0.035$; $c=0.010$, $d=0.005$ and $e=0.072$.

Figure 6:
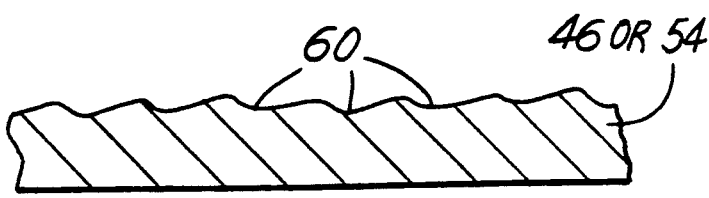
FIG. 6 is a view like FIG. 4B showing a further alternative embodiment of the invention.

While discrete depressions form the detents in the embodiments which have been described above, it will be understood that such detents can be formed in many other ways. For example, FIG. 6 shows another embodiment of bearing race surface 46 or 54 in which continuous or substantially continuous undulations or serrations 60 in the surface provide detents. In embodiments of this kind, the entire surface of the bearing race may be contoured so that there is little or no flat surface.

Thrust ring 50 may be constructed to have a slight dish-like deflection characteristic of a belleville spring or compression spring, as shown in FIGS. 2A and 2B. Alternatively, thrust washer 50 may have a flat profile, as shown in FIG. 3B, but may be made of a material having sufficient flexibility to permit thrust washer 50 to assume an elastic dish-like deflection when the jaws of the chuck are tightened onto the shank of a tool.

The detents and belleville spring configuration (either built-in or elastically deformable) serve to create alternating high and low energy states (stress conditions) for the balls in bearing assembly 48, the high energy states corresponding to location of the balls of bearing assembly 48 against the flats of bearing races 46 and 54 (stressed state), while the low energy states correspond to location of the balls in detents 56 (unstressed state). Accordingly, when front and rear sleeves 11 and 12 are tightened together onto the shank of a tool, bearing assembly 48 and detented thrust ring 50 serve as a ratchet mechanism, so that the nut is less susceptible to loosening during operation of the tool. While either of the above-described detents or springs can be used in accordance with this invention, it is believed that better results are achieved by the use of both of these features in combination. Detents 56 in either or both bearing race surfaces 46 and 54 may have nonsymmetrically radiused corners as described heretofore, to enhance the ratchet-style cooperation between bearing assembly 48 and the bearing surfaces.

Figure 5A:
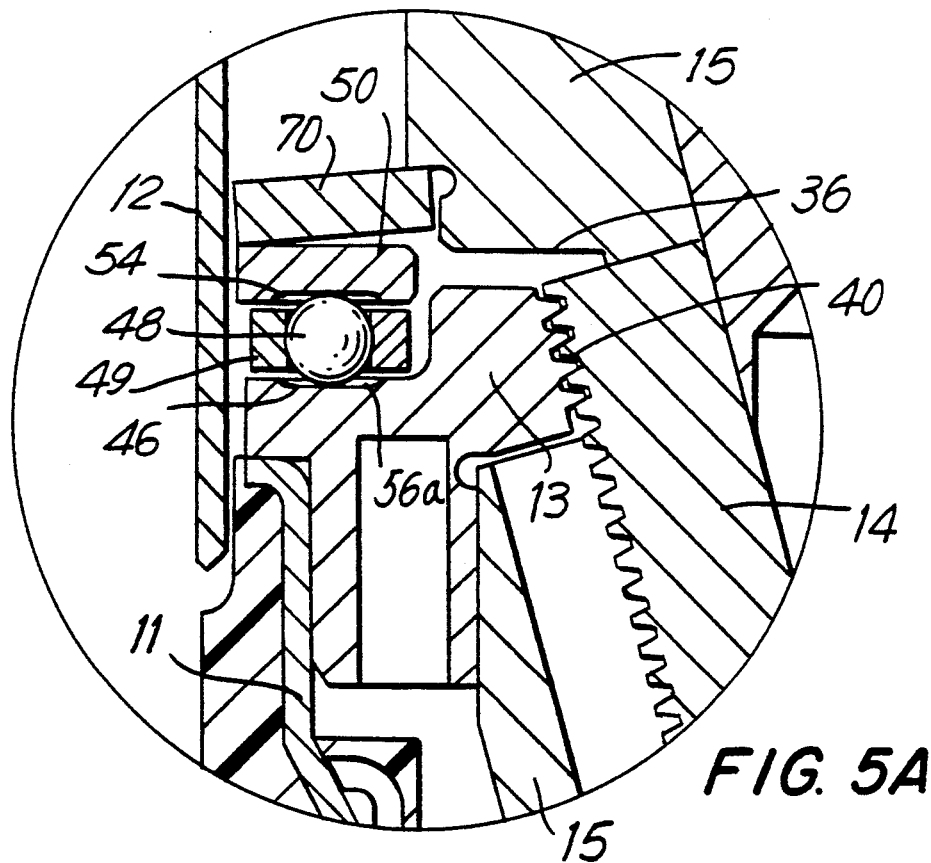
FIGS. 5A and 5B are enlarged fragmentary sectional views of the operation of a chuck having a thrust washer as shown in FIGS. 3A and B.
Figure 5B:
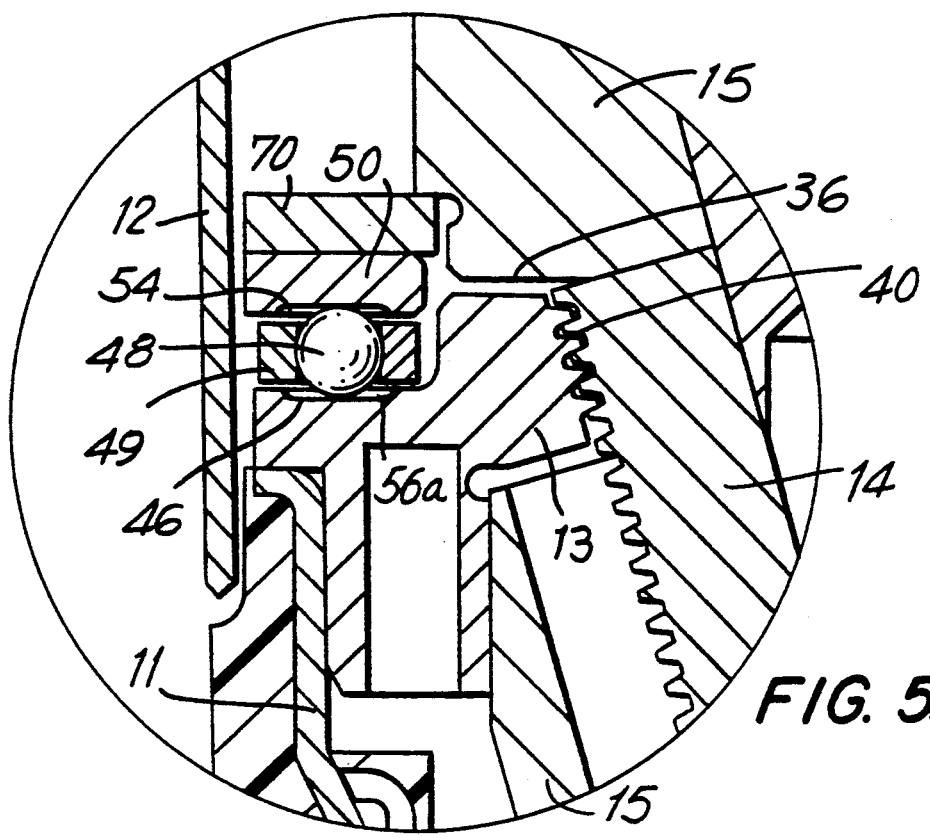

Referring to FIGS. 5A and 5B, an alternate embodiment of the present invention will now be described in which separate thrust ring 50 and belleville spring 70 are employed. In this configuration, a belleville spring or other type of compression spring 70 is interposed between thrust ring 50 and the retaining ledge of body member 15. As in the previous embodiments, detents 56 (on thrust ring 50) and compression spring 70 cooperate so that when nut 13 and body 15 are tightened together, impacts transmitted through the chuck body during operation are less likely to cause the chuck to loosen and cease to effectively grip the tool held in jaws 14. In particular, such impacts are unlikely to overcome the difference between the high and low energy states of the balls of bearing assembly 48, the latter corresponding to the location of the balls resting in the detents. As suggested in the foregoing and shown in FIGS. 5A and 5B, rear surface 46 of nut 13 may have detents 56a similar to those in thrust ring 50. Depending upon the specific application of the chuck and the expected impact loads during operation, the choice of having detents in either or both surfaces 46 and 54, the number of detents 56 and 56a, and the manner in which the edges of the detents are radiused can be optimized.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of said jaws being slidably positioned in a respective one of said angularly disposed passageways, said jaws being reciprocable relative to said body member;
   (c) a nut rotatable relative to said body member and threadedly engaged with said jaws for reciprocating said jaws relative to said body member when said nut is rotated relative to said body member, said nut being axially reciprocable relative to said body member such that said nut moves axially away from said tool in reaction to said jaws gripping said tool shank;
   (d) spring means acting between said nut and said body member so that said spring is stressed by an increasing amount as a result of said nut moving axially away from said tool in reaction to said jaws gripping said tool shank, the increased stress in said spring means increasing the resistance of said nut to rotating relative to said body member in the direction opposite the direction required to grip said tool shank, said spring means being substantially the sole means for resisting axial motion of said nut away from said tool; and
   (e) an anti-friction bearing assembly interposed between said nut and said spring means.

2. The apparatus as defined in claim 1 wherein the spring means comprises a belleville-style compression spring.

3. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of said jaws being slidably positioned in a respective one of said angularly disposed passageways, said jaws being reciprocable relative to said body member;
   (c) a nut having a plurality of detents formed therein, said nut being rotatable relative to said body member and threadedly engaged with said jaws for reciprocating said jaws relative to said body member when said nut is rotated relative to said body member; and
   (d) at least one bearing member interposed between said nut and said body member, said bearing member moving into and out of successive ones of said detents as said nut is rotated to reciprocate said jaws to grip said tool shank, said bearing member cooperating with a detent into which said bearing member has moved to increase the resistance of said nut to rotating in the opposite direction relative to said body member.

4. The apparatus as defined in claim 3 wherein said bearing member is a ball bearing.

5. The apparatus as defined in claim 3 further comprising spring means acting between said nut and said body member.

6. The apparatus as defined in claim 5 wherein said spring means comprises a belleville spring.

7. The apparatus as defined in claim 5 wherein said spring means comprises a washer.

8. The apparatus as defined in claim 7 wherein said washer has a plurality of detents formed therein.

9. The apparatus as defined in claim 3 further comprising a washer interposed between said nut and said body member.

10. The apparatus as defined in claim 7 wherein said washer has a plurality of detents formed therein.

11. The apparatus as defined in claim 3 wherein said plurality of detents is aligned radially of said axial bore.

12. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of said jaws being slidably positioned in a respective one of said angularly disposed passageways, said jaws being reciprocable relative to said body member; and
   (c) a nut having a plurality of detents formed therein, said nut being rotatable relative to said body member and threadedly engaged with said jaws for reciprocating said jaws relative to said body member when said nut is rotated relative to said body member, said plurality of detents acting so that when said nut is rotated to reciprocate said jaws to grip said tool shank, said plurality of detects increase the resistance of said nut to rotating in the opposite direction relative to said body member, wherein each of said plurality of detents has a pair of opposing edges aligned parallel to each other and substantially parallel to a radius extending from said axial bore, said pair of opposing edges having radiused corners.

13. The apparatus as defined in claim 12 wherein each of said opposing edges of said detents have differently radiused corners.

14. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of which is slidably positioned in a respective one of said angularly disposed passageways, said jaws being reciprocable relative to said body member;
   (c) a nut rotatable relative to said body member and threadedly engaged with said jaws for reciprocating said jaws relative to said body member when said nut is rotated relative to said body member; and
   (d) a washer disposed between said nut and said body member, said washer having a plurality of detents formed therein; and
   (e) at least one bearing member interposed between said nut and said washer, said bearing member moving into and out of successive ones of said detents as said nut is rotated to reciprocate said jaws to grip said tool shank, said bearing member cooperating with a detent into which said bearing member has moved to increase the resistance of said nut to rotating in the opposite direction relative to said body member.

15. The apparatus as defined in claim 14 wherein said bearing member is a ball bearing.

16. The apparatus as defined in claim 14 further comprising spring means acting between said washer and said body member.

17. The apparatus as defined in claim 14 wherein said washer has a belleville-spring style deflection in the unstressed condition.

18. The apparatus as defined in claim 14 wherein said plurality of detents is aligned radially of said axial bore.

19. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of which is slidably positioned in a respective one of said angularly disposed passageways, said jaws being reciprocable relative to said body member;
   (c) a nut rotatable relative to said body member and threadedly engaged with said jaws for reciprocating said jaws relative to said body member when said nut is rotated relative to said body member; and
   (d) a washer disposed between said nut and said body member, said washer having a plurality of detents formed therein, said washer capable of being stressed when said nut is rotated to reciprocate said jaws to grip said tool shank, so as to increase the resistance of said nut to rotating in the opposite direction relative to said body member, wherein said washer has a flat profile in the unstressed condition, but said washer is capable of elastically deforming to attain a belleville-spring style deflection in the stressed condition.

20. A tool chuck for gripping a tool shank, said chuck comprising:
   (a) a body member having an axial bore formed therein and a plurality of angularly disposed passageways formed therethrough and intersecting said axial bore;
   (b) a plurality of jaws, each of which is slidably positioned in a respective one of said angularly disposed passageways, said jaws being reciprocable relative to said body member;
   (c) a nut rotatable relative to said body member and threadedly engaged with said jaws for reciprocating said jaws relative to said body member when said nut is rotated relative to said body member; and
   (d) a washer disposed between said nut and said body member, said washer having a plurality of detents formed therein, said washer capable of being stressed when said nut is rotated to reciprocate said jaws to grip said tool shank, so as to increase the resistance of said nut to rotating in the opposite direction relative to said body member, wherein each of said plurality of detents has a pair of opposing edges aligned parallel to each other and substantially parallel to a radius extending from said axial bore, said pair of opposing edges having radiused corners.

21. The apparatus as defined in claim 20 wherein each of said opposing edges of said detents have differently radiused corners.

22. A tool chuck for gripping a tool shank, said chuck comprising:
   (a) a body member having an axial bore formed therein and a plurality of angularly disposed passageways formed therethrough and intersecting said axial bore;
   (b) a plurality of jaws each of which is slidably positioned in a respective one of said angularly disposed passageways, said jaws being reciprocable relative to said body member;
   (c) a nut rotatable relative to said body member and threadedly engaged with said jaws for reciprocating said jaws relative to said body member when said nut is rotated relative to said body member;
   (d) a washer disposed between said nut and said body member, said washer having a plurality of detents formed therein;
   (e) spring means acting between said washer and said body member, said spring means capable of being stressed when said nut is rotated to reciprocate said jaws to grip said tool shank; and
   (f) at least one bearing member interposed between said nut and said washer, said bearing member moving into and out of successive ones of said detents as said nut is rotated to grip said tool shank, said bearing member cooperating with a detent into which said bearing member has moved to increase the resistance of said nut to rotating in the opposite direction relative to said body member.

23. The apparatus as defined in claim 22 wherein said bearing member is a ball bearing.

24. The apparatus as defined in claim 22 wherein said washer has a belleville-spring style deflection in the unstressed condition.

25. The apparatus as defined in claim 22 wherein said plurality of detents is aligned radially of said axial bore.

26. The apparatus as defined in claim 22 wherein said nut has a plurality of detents formed therein.

27. A tool chuck for gripping a tool shank, said chuck comprising:

(a) a body member having an axial bore formed therein and a plurality of angularly disposed passageways formed therethrough and intersecting said axial bore;

(b) a plurality of jaws each of which is slidably positioned in a respective one of said angularly disposed passageways, said jaws being reciprocable relative to said body member;

(c) a nut rotatable relative to said body member and threadedly engaged with said jaws for reciprocating said jaws relative to said body member when said nut is rotated relative to said body member;

(d) a washer disposed between said nut and said body member, said washer having a plurality of detents formed therein; and (e) spring means acting between said washer and said body member, said spring means capable of being stressed when said nut is rotated to reciprocate said jaws to grip said tool shank, so as to increase the resistance of said nut to rotating in the opposite direction relative to said body member, wherein each of said plurality of detents has a pair of opposing edges aligned parallel to each other and substantially parallel to a radius extending from said axial bore, said pair of opposing edges having radiused corners.

28. The apparatus as defined in claim 27 wherein each of said opposing edges of said detents have differently radiused corners.

29. A tool chuck comprising a body member having an axial bore formed therein and a plurality of angularly disposed passageways formed therethrough and intersecting said axial bore, a plurality of jaws each of which is slidably positioned in a respective one of said angularly disposed passageways, said jaws being reciprocable relative to said body member, a nut rotatable relative to said body member and threadedly engaged with said jaws for reciprocating said jaws relative to said body member when said nut is rotated relative to said body member, said nut having a first bearing race formed thereon, a thrust ring having a second bearing race formed thereon and in juxtaposition with said first bearing race, said second bearing race defining a plurality of detents, and a rolling anti-friction bearing disposed between said first and second bearing races so that said bearing rolls into and out of successive ones of said detents as said nut is rotated to reciprocate said jaws to grip said tool shank, said bearing cooperating with a detent into which said bearing has rolled to increase the resistance of said nut to rotating in the opposite direction relative to said body member.

30. The apparatus as defined in claim 29 wherein said first bearing race defines a second plurality of detents.

31. The apparatus as defined in claim 29 wherein said anti-friction bearing is a ball bearing, so that said ball bearing engages said detents in said second hearing race.

32. The apparatus as defined in claim 29 wherein said detents are oriented radially of said axial bore.

33. A tool chuck comprising a body member having an axial bore formed therein and a plurality of angularly disposed passageways formed therethrough and intersecting said axial bore, a plurality of jaws each of which is slidably positioned in a respective one of said angularly disposed passageways, said jaws being reciprocable relative to said body member, a nut rotatable relative to said body member and threadedly engaged with said jaws for reciprocating said jaws relative to said body member when said nut is rotated relative to said body member, said nut having a first bearing race formed thereon, a thrust ring having a second bearing race formed thereon and in juxtaposition with said first bearing race, said second bearing race defining a plurality of detents, and an anti-friction bearing disposed between said first and second bearing races, said detents in said second bearing race being capable of engaging said antifriction assembly when said nut is rotated to reciprocate said jaws to grip said tool shank, so as to increase the resistance of said nut to rotating in the opposite direction relative to said body member, wherein said thrust ring has a belleville-spring style deflection in the unstressed condition.

34. A tool chuck comprising a body member having an axial bore formed therein and a plurality of angularly disposed passageways formed therethrough and intersecting said axial bore, a plurality of jaws each of which is slidably positioned in a respective one of said angularly disposed passageways, said jaws being reciprocable relative to said body member, a nut rotatable relative to said body member and threadedly engaged with said jaws for reciprocating said jaws relative to said body member when said nut is rotated relative to said body member, said nut having a first bearing race formed thereon, a thrust ring having a second bearing race formed thereon and in juxtaposition with said first bearing race, said second bearing race defining a plurality of detents, and an anti-friction bearing disposed between said first and second bearing races, said detents in said second bearing race being capable of engaging said antifriction assembly when said nut is rotated to reciprocate said jaws to grip said tool shank, so as to increase the resistance of said nut to rotating in the opposite direction relative to said body member, further comprising spring means acting between said thrust ring and said nut.

35. A tool chuck comprising a body member having an axial bore formed therein and a plurality of angularly disposed passageways formed therethrough and intersecting said axial bore, a plurality of jaws each of which is slidably positioned in a respective one of said angularly disposed passageways, said jaws being reciprocable relative to said body member, a nut rotatable relative to said body member and threadedly engaged with said jaws for reciprocating said jaws relative to said body member when said nut is rotated relative to said body member, said nut having a first bearing race formed thereon, a thrust ring having a second bearing race formed thereon and in juxtaposition with said first bearing race, said second bearing race defining a plurality of detents, and an anti-friction bearing disposed between said first and second bearing races, said detents in said second bearing race being capable of engaging said antifriction assembly when said nut is rotated to reciprocate said jaws to grip said tool shank, so as to increase the resistance of said nut to rotating in the opposite direction relative to said body member, wherein each of said plurality of detents has a pair of opposing edges aligned parallel to each other and substantially parallel to a radius extending from said axial bore, said pair of opposing edges having radiused corners.

36. The apparatus as defined in claim 35 wherein each of said opposing edges of each of said detents have differently radiused corners.

* * * * *